E. H. FUNK.
Evaporating Pan.
No. 35,092. Patented Apr. 29, 1862.
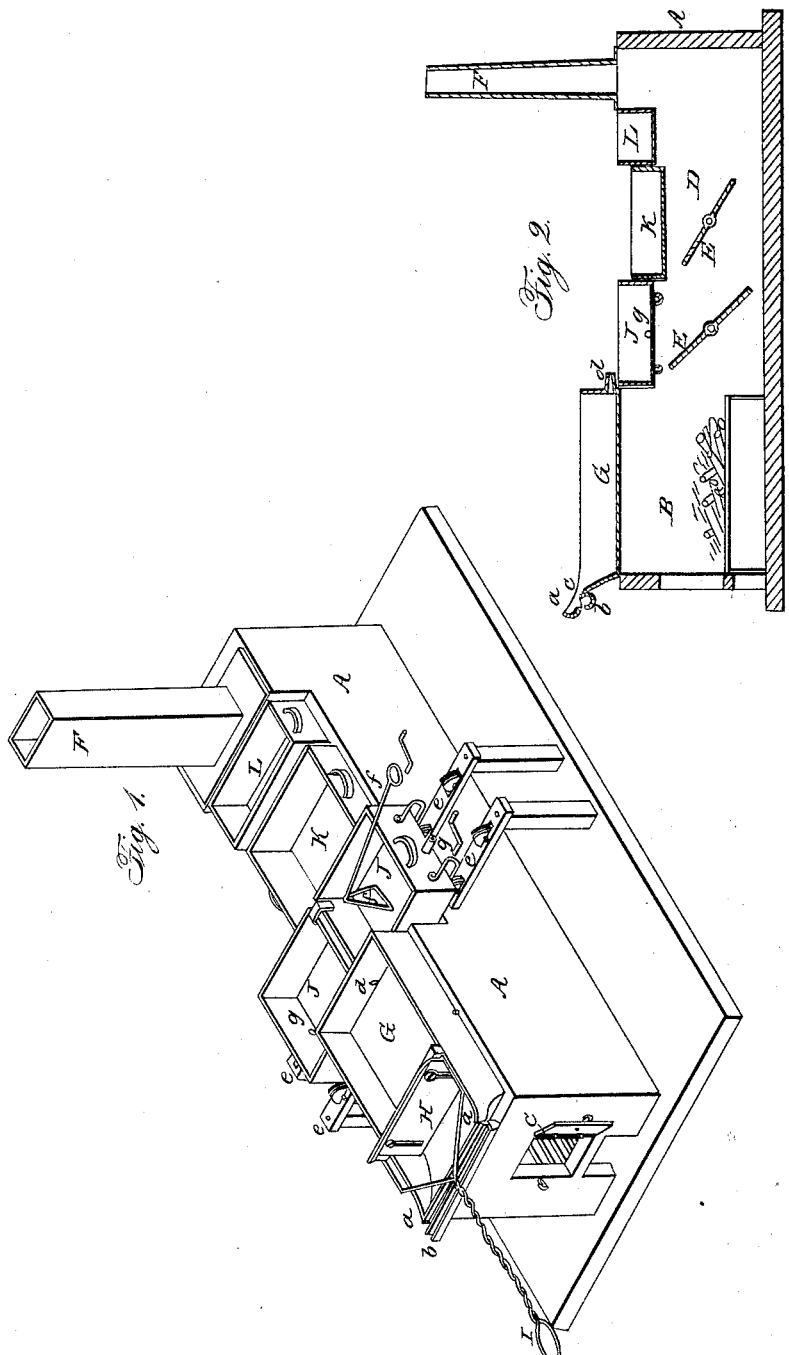
Witnesses:
John Mathers
H. W. Price
Inventor:
E. H. Funk

UNITED STATES PATENT OFFICE.

ELLIOTT H. FUNK, OF NEWARK, OHIO.

IMPROVED EVAPORATOR FOR SACCHARINE JUICES.

Specification forming part of Letters Patent No. 35,092, dated April 29, 1862.

*To all whom it may concern:*

Be it known that I, ELLIOTT H. FUNK, of Newark, in the county of Licking and State of Ohio, have invented certain new and useful Improvements in an Apparatus for Evaporating and Clarifying Sorghum and other Saccharine Juices for the Purpose of Making Molasses or Sugar therefrom; and I do hereby declare that the following is a full, clear, and exact description thereof, reference being had to the accompanying drawings, making a part of this specification, in which—

Figure 1 represents a perspective view of the entire apparatus; and Fig. 2 represents a longitudinal vertical section through the same.

Similar letters of reference, where they occur in the separate figures, denote like parts of the apparatus in both of the figures.

My invention consists in the arrangement of the evaporating and clarifying pans with regard to the furnace, and this whether the granulating or precipitating pan or pans be used or not, which will depend upon whether molasses only, or sugar, or portions of each, are to be made.

To enable others skilled in the art to make and use my invention, I will proceed to describe the same with reference to the drawings.

A represents a furnace or block of suitable size, which may be built of brick-work. These walls inclose a fire-chamber, B, with a grate, C, on which the fuel is burned, and behind the fire-chamber a heating-chamber, D, furnished with dampers E for regulating and directing the heat to the pans or kettles placed over it, and at the end of the furnace is the chimney or stack F. Immediately over the fire-chamber is placed an evaporating pan or kettle, G, somewhat elevated at its front end, as at $a$, and with an opening, $c$, under which there is a trough or spout, $b$. The juice of the sorghum is first placed in this pan or kettle G to evaporate the water in it, and as the impurities arise on the surface they are drawn off by a scraper or skimmer, H, which rests upon the sides of the pan, and the blade of which is made adjustable so as to reach just below the surface of the juice in the pan. This skimmer is worked by a handle, I, and the skimmings are drawn up to and pass through the opening $c$, and thence through the trough $b$ into any suitable receiver. When the cane-juice is sufficiently condensed, it is drawn from the pan or kettle G through a pipe or spout, $d$, into one of the clarifying-pans J J, which pans are set upon ways $e$ $e$, so that when they have received their charge they may be drawn off from the fire and allow the liquid to settle and clarify, while the other pan of the pair may receive its charge from G. When the pan or kettle J is drawn off from the fire, all the impurities in the sirup rise to the surface, leaving that at the bottom perfectly clear. This clear sirup or molasses may be then drawn off into proper vessels for use; or, if sugar is to be made, then this molasses may be drawn or put into the granulating-pan K and converted into sugar. While the liquid is in the pan J that is over the fire, or during the process of granulation or crystallization in the pan K, the stirrer $f$ should be used to keep the molasses from burning. Each of the pans J J is furnished with a draw-off pipe and cock at $g$, near their bottoms, so as to take off the clarified molasses, leaving that at the surface which is still mixed with impurities to further settle and become clarified.

L is a vessel for containing water, which may be used for cleansing the pans, skimmer, or stirrer, or such other things as may be used in the process of making molasses or sugar; and when the vessels K L, or either of them, are not required or used in the process, they may be removed and an iron cover laid over the furnace on the parts thereof which they occupy.

Having thus fully described the nature and object of my invention, what I claim is—

The construction and arrangement of the pans or kettles G J J with relation to the furnace and to each other, for the purpose of evaporating, and clarifying, and converting into molasses the juice of sorghum, as herein described and represented, and these I claim whether the pan K be used in connection with them or not, as set forth.

E. H. FUNK.

Witnesses:
  A. B. STOUGHTON,
  H. W. PRICE.